April 22, 1969 W. L. RONCI 3,440,536
PASSIVE CIRCUIT INCLUDING A THERMISTOR FOR PROVIDING HIGH
LEVEL VOLTAGE VARIATIONS IN RESPONSE TO LOW
LEVEL CURRENT VARIATIONS
Filed Oct. 11, 1965

INVENTOR

WILLIAM L. RONCI

BY James L. O'Brien

ATTORNEY

United States Patent Office 3,440,536
Patented Apr. 22, 1969

3,440,536
PASSIVE CIRCUIT INCLUDING A THERMISTOR FOR PROVIDING HIGH LEVEL VOLTAGE VARIATIONS IN RESPONSE TO LOW LEVEL CURRENT VARIATIONS
William L. Ronci, Ann Arbor, Mich., assignor to The Bendix Corporation, a corporation of Delaware
Filed Oct. 11, 1965, Ser. No. 494,548
Int. Cl. G01r 5/26, 23/04, 25/02
U.S. Cl. 324—106       2 Claims

ABSTRACT OF THE DISCLOSURE

An electrical circuit for providing high level voltage variations in response to low level current variations having a resistor connected in series with the source of current to be measured, a thermistor thermally coupled with the resistor, and a Wheatstone bridge having the first thermistor as one arm of the bridge and a second ambient temperature compensating thermistor as an adjacent arm of the bridge.

---

This invention relates to an apparatus for indicating current in an electrical circuit and more particularly to a transducer responsive to low level current variations to provide corresponding high level voltage variations representative of the current variations.

Numerous applications require that current in an electrical circuit be monitored remotely. For example, flight test telemetry systems require current measurements in a number of circuits including power supply circuits. One way of measuring current for remote monitoring employs a low impedance meter-type shunt that senses the current to be monitored. However, the meter-type shunt has a low level output which must be amplified by high gain amplifiers before being fed to a modualtor for transmission to a remote monitoring receiver. Eliminating the need for high gain amplifiers by providing a high level voltage output directly is desirable, particularly in measuring direct currents. High level voltage outputs are also useful in numerous other applications for measuring and indicating low level currents. Additionally noise and other transients in a power supply are coupled into the monitoring circuit through the meter-type shunt. Therefore it is desirable to electrically isolate the monitoring circuit from the power supply.

The objects of this invention are to provide a transducer which effectively provides a high level voltage output in response to a low level current input; that provides electrical isolation between the input and the output; that is small, compact and lightweight; that can be constructed economically; that dissipates very little input power; and that is rugged and dependable.

Further objects of the present invention include measuring and indicating low level current variations with an apparatus that operates effectively and is constructed economically.

Figure 1:
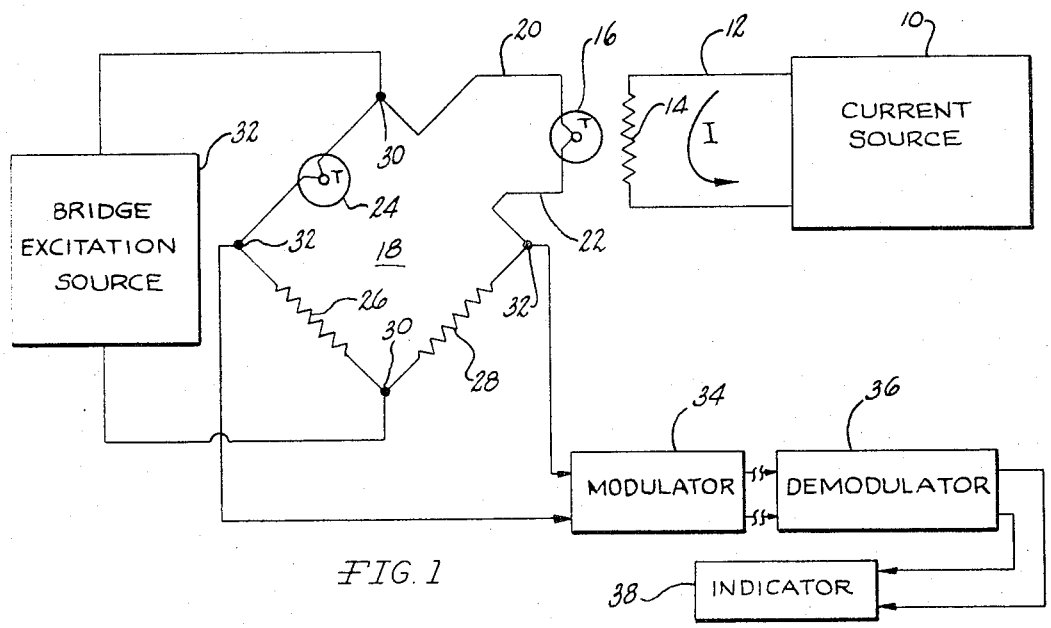
Figure 2:
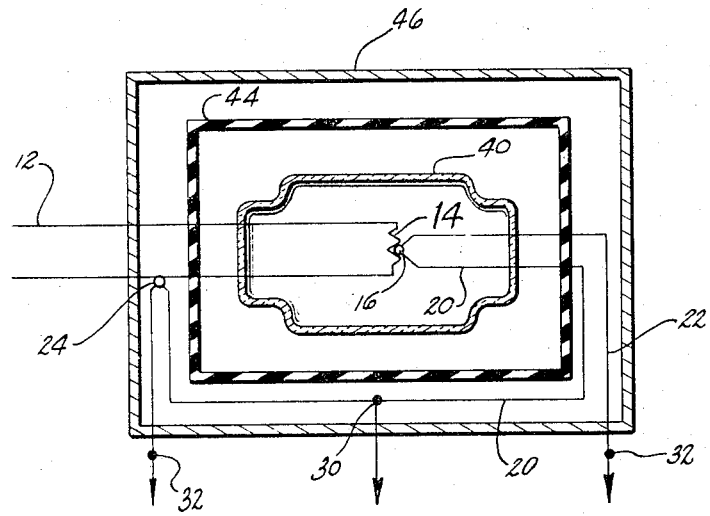

Other objects, features and advantages of the present invention will become apparent from a consideration of the following description, the appended claims, and the accompanying drawings in which:

FIGURE 1 is a circuit diagram illustrating one important aspect of the present invention where a heater is connected in series with the current to be measured and a first bead-type thermistor thermally coupled to the heater is connected in a Wheatstone bridge to provide a high level voltage output which is compensated for ambient temperature variations by a second bead thermistor also connected in the bridge; and FIGURE 2 is a view schematically illustrating encapsulation of the heater and the first thermistor in an evacuated bulb to isolate the heater and the first thermistor from the ambient environment with compensation for heat transfer into the bulb through the heater leads being provided by placing the second thermistor in direct contact with the leads.

An electrical current source 10 includes a conductor 12 in which a heater resistor 14 is serially connected. Conductor 12 and resistor 14 carry a current I that is to be measured. Resistor 14 has a predetermined temperature response to current flowing in conductor 12. Immediately adjacent and thermally coupled to resistor 14 is a bead thermistor 16 which responds to temperature variations produced by resistor 14. Thermistor 16 is connected in one arm of a Wheatstone bridge, designated generally by numeral 18, by conductors 20, 22. A second bead thermistor 24 is connected in an arm of bridge 18 adjacent the arm containing thermistor 16. Respective resistors 26, 28 are connected in the remaining two arms of bridge 18. Connected across one pair of opposite terminals 30 in bridge 18 is an electrical potential source 32 for energizing bridge 18. Source may be either alternating or direct current. The other pair of opposite terminals 32 of bridge 18 serve as output terminals and are connected to a modulator 34 having an output which is remotely signalled to a demodulator 36 whose output is applied to an indicator 38.

With the circuit shown in FIG. 1 the temperature of resistor 14 varies in accordance with variations of the current flowing in conductor 12. Temperature variations at resistor 14 cause impedance variations in thermistor 16 to unbalance bridge 18 and develop high level voltage variations at terminals 32. By properly selecting the circuit parameters, a voltage output at terminals 32 on the order of volts can be achieved for direct application to modulator 34 without amplification. Compensation for ambient temperature variations is provided in bridge 18 by thermistor 24. By properly selecting the characteristics of resistor 14 and thermistors 16, 24, and calibrating indicator 38, current variations at conductor 12 are indicated at indicator 38.

By way of illustration and not limitation, modulator 34 may be any type of data multiplexer, including a commutator, voltage controlled oscillator or pulse modulation keyer, etc., which requires a reasonably high level voltage input, of magnitude in the order of volts, to provide a useful modulated output. Thermistors 16, 24 may be any one of a wide variety of bead-type thermistors which are presently available with dissipation constants (power in milliwatts required to raise thermistor temperature 1° C.) in the range of from 0.1 to 1. Thermistors 16, 24 each have an extremely small mass and closely follow the temperature of resistor 14 and the ambient, respectively. With such thermistors, impedance variations of several orders of magnitude can be developed with temperature variations on the order of 100° C. Such temperature variations can be obtained with a 100 millivolt resistor (resistor 14) which would dissipate only 500 milliwatts in a one amp circuit. Thermistors 16, 24 should have matched temperature-impedance characteristics, preferably in the order of 1% or better.

FIG. 2 illustrates one arrangement for thermally isolating resistor 14 and the associated thermistor 16 from ambient surroundings to increase the accuracy and sensitivity of the circuit illustrated in FIG. 1. Thermistor 16 and resistor 14 are encapsulated in an evacuated glass bulb 40. Conductor 12 from the resistor 14 and conductors 20, 22 from thermistor 16 pass through the bulb 40 for connection in the circuit illustrated in FIG. 1. Bulb 40 is completely surrounded by a housing 44 formed of thermal insulating material to provide a heat shield for the bulb 40 from ambient temperature variations. Thermistor 24 is disposed in direct contact with conductor 12 so that the temperature of thermistor 24 can closely follow the temperature of the conductor exteriorly of bulb 40. Bulb 40 and the heat shield housing 44 together with thermistor 44 are enclosed in a protective housing 46. Since thermistor 16 will respond to heat conducted into bulb 40 from the ambient through conductors 12, 20 and 22, compensation is desirable. By proper thermal design including the size and thermal conductivity of conductors 12, 20 and 22, conductor 12 is made the principal heat path from the ambient into bulb 40. Thermistor 24 provides compensation for heat flow into bulb 40 through conductor 12 so that the output of bridge 18 depends primarily on impedance changes in thermistor 16 caused by the current through resistor 14. As illustrated in FIG. 2, thermistor 16 may be embedded directly in resistor 14 to closely follow the temperature of resistor 14 so long as thermistor 16 remains electrically isolated from resistor 14.

With the current measuring and indicating circuit and method described hereinabove, current measurements that are accurate to within 3% to 5% and therefore compatible with existing telemetry systems can be achieved. A voltage output at terminals 32 of magnitude in the order of volts can be achieved for monitored currents in the milliamp range to eliminate high gain amplifiers which previously were required to obtain a useful modulator input. The circuit described operates with relatively low power drain on source 10. Thermistor 16 is electrically isolated from resistor 14 so that noise and other transients in source 10 are not coupled to the output terminals 32.

What is claimed is:

1. In combination an electrical circuit, a first electrical source operatively coupled to said circuit to establish a current in said circuit, and means responsive to said current to indicate low level variations in said current comprising first impedance means connected in series with a first electrical conductor in said circuit to carry said current, said first impedance means providing temperature variations in response to said current variations, a four terminal bridge circuit having four arms, a first thermistor operatively connected in one arm and thermally coupled to said first impedance means to vary the impedance of said one arm in response to said current variations, a second thermistor operatively connected in an adjacent arm disposed immediately adjacent to and in direct thermal communication with said conductor to vary the impedance of said adjacent arm in accordance with temperature variations of an ambient environment, a second electrical source operatively connected to one pair of opposite terminals in said bridge to energize said bridge and provide high level voltage variations at the other pair of terminals of said bridge in response to impedance variations in said arms, and means directly connected to said other pair being operative in response only to said high level voltage variations to provide an indication of said low level current variations.

2. The combination set forth in claim 1 wherein said first impedance means and first thermistor are encapsulated in an evacuated chamber, said conductor forms a principal heat path into said chamber and said second thermistor is in direct thermal contact with said conductor exteriorly of said chamber.

References Cited

UNITED STATES PATENTS

| | | | |
|---|---|---|---|
| 1,495,795 | 5/1924 | Pierce | 324—106 |
| 1,643,582 | 9/1927 | Martin. | |
| 2,449,072 | 9/1948 | Houghton | 324—106 XR |
| 2,496,879 | 2/1950 | Lafferty | 324—106 XR |
| 2,645,756 | 7/1953 | Goodwin | 324—106 XR |
| 3,199,348 | 8/1965 | Salera | 73—204 |
| 3,327,213 | 6/1967 | Von Wald et al. | 324—106 |

RUDOLPH V. ROLINEC, *Primary Examiner.*

E. F. KARLSEN, *Assistant Examiner.*

U.S. Cl. X.R.

324—95